United States Patent
Zaczyk

(10) Patent No.: US 9,655,471 B2
(45) Date of Patent: May 23, 2017

(54) DISPOSABLE, NON-ABSORBENT, SPLATTER GUARD

(71) Applicant: Terri M Zaczyk, Cary, NC (US)

(72) Inventor: Terri M Zaczyk, Cary, NC (US)

(*) Notice: Subject to any disclaimer, the term of this patent is extended or adjusted under 35 U.S.C. 154(b) by 0 days.

(21) Appl. No.: 14/583,128

(22) Filed: Dec. 25, 2014

(65) Prior Publication Data
US 2015/0182069 A1 Jul. 2, 2015

Related U.S. Application Data

(60) Provisional application No. 61/964,182, filed on Dec. 26, 2013.

(51) Int. Cl.
*A47J 36/06* (2006.01)

(52) U.S. Cl.
CPC ..................... *A47J 36/06* (2013.01)

(58) Field of Classification Search
CPC ........................................ A47J 36/06
USPC ......... 220/573.1, 369, 370, 796, 805, 212.5; D7/391
See application file for complete search history.

(56) References Cited

U.S. PATENT DOCUMENTS

| | | | | |
|---|---|---|---|---|
| 1,970,622 A * | 8/1934 | Petrucelly | ............... | A45D 44/12 2/174 |
| 2,535,084 A * | 12/1950 | Meunier | ................ | A45D 44/12 132/319 |
| 2,686,608 A * | 8/1954 | Rock | ..................... | A47J 37/101 126/9 B |
| 3,363,406 A * | 1/1968 | Miller | ..................... | A47J 36/06 55/500 |
| 3,931,925 A * | 1/1976 | Ruff | ........................ | A47G 21/04 229/125.03 |
| 4,291,803 A * | 9/1981 | Perales | .................. | B65D 59/02 206/303 |
| 4,890,652 A * | 1/1990 | Hoerner | .............. | B65B 67/1238 141/10 |
| 4,989,748 A * | 2/1991 | Parr, Jr. | .................. | A47G 19/26 219/734 |
| 2008/0272124 A1 * | 11/2008 | Shamoon | .............. | A47J 37/101 220/370 |

* cited by examiner

Primary Examiner — James N Smalley
(74) Attorney, Agent, or Firm — Stephen E Howe

(57) ABSTRACT

A disposable, non-absorbent cooking utensil is described for selectively covering foodstuffs in stovetop, microwave, oven, slow-roaster, crockpot, griddle or grill-top cooking operations. The entire cover, with integrated handle, has sufficient wet-strength and rigidity to maintain its shape and integrity so as to be easily removable and replaceable during cooking. The cover is made of a non-absorbent and optionally fire-resistant material that is permeable enough to allow steam to escape while still containing grease splatter and cooking liquids within the cooking vessel, thereby preventing boil-over or foaming of liquids (as can be caused by starch when cooking pasta and potatoes, etc.) and promoting a cooking environment similar to uncovered frying or cooking; enabling thickening and frying, etc. The material of the cover is also sufficiently resistant to the conduction of heat that the integrated handle does not get so hot during operation that it prevents easy grasping and lifting without getting burned. Once used, the entire cover is easily discarded creating minimal waste due to its minimal material content, obviating the need for messy cleanup.

8 Claims, 4 Drawing Sheets

US 9,655,471 B2

DISPOSABLE, NON-ABSORBENT, SPLATTER GUARD

REFERENCES (INCORPORATED HEREIN BY REFERENCE)

Provisional patent application 61/964,182

STATEMENT REGARDING FEDERALLY SPONSORED RESEARCH

Not applicable.

MICROFICHE APPENDIX

Not applicable.

FIELD OF THE INVENTION

This invention is in the general field of cooking utensils and relates to a covering device for cooking vessels. It also relates generally to disposable utensils and cookware for food preparation. Particularly, the invention relates to covers used to prevent splatter of grease and cooking liquids and to prevent boil-over when used in conjunction with a wide variety of cooking vessels and cooking methods, including, but not limited to: pots and pans for stovetop cooking; glass, plastic and ceramic vessels for use in microwave heating and cooking; casserole dishes, roasters, bake ware, pie pans and Dutch ovens for use in oven cooking; and counter top crock pots and slow roasters. More particularly, this invention relates to a disposable splatter guard comprising a heat and flame resistant, non-absorbent material of sufficient rigidity and wet strength to render it easily manipulated; a handle for easy of removal and/or positioning; and a shape that conveniently conforms to the shape of a wide variety of cooking vessels.

BACKGROUND

Splattering of grease and other liquids during any cooking process is undesirable from two standpoints. First, splattering of grease and cooking liquids onto cook-tops, counters and the interior surfaces of microwave ovens and standard ovens necessitates extraneous cleaning during and after the cooking process. Second, splattering can present safety concerns, as hot grease and liquids have been known to cause serious burns to the cook's hands, arms and face while the food is being prepared. It can also create fire hazards, particularly in stovetop and oven cooking. In some types of cooking, such as boiling or steaming, solid, impermeable covers may be used. Other types of cooking, however, such as thickening or reductions, require that steam can escape. And still other cooking methods, such as frying, searing and sautéing, require high cooking temperatures, preferentially only at the cooking surface, and this can not be readily effected without the removal of steam and moisture from the cooking vessel.

Some of the devices currently available to control splattering include: metal covers or mesh covers which are placed over the vessel or food item being prepared via stovetop cooking; plastic covers and absorbent papers which are placed over or around foods being prepared in the microwave; aluminum foil and parchment paper placed over casseroles and roasting pans in ovens. None of these devices, however, combine all the attributes of being disposable, universally adaptable to all of the major cooking environments and capable of maintaining a cooking environment suitable for all cooking types.

For example, splatter guards currently available for stovetop use, although capable of preventing splatter of cooking liquids and being generally heat and flame-resistant, have several disadvantages. First, they are generally made of materials of medium to high heat capacity and conductivity, rendering them potential burn hazards during cooking. Many are designed to fit only a specific size and shape of a given pot or pan and shape, limiting the scope of their versatility. Many are also not useable in oven or microwave cooking applications. Finally, they are relatively expensive, non-disposable and can be difficult to clean. By way of examples, U.S. Pat. No. 3,809,281, U.S. Pat. Nos. 5,992, 675, D302,637, D494,427 and D567,597 all teach the use of splatter guards which utilize wire mesh to prevent splatter while still allowing steam and other cooking vapors to escape, rendering an environment suitable for frying, searing and sautéing. However, being made of metal, they cannot be used in the microwave, their configuration is not suitable for oven use, and they are not disposable. Furthermore, their mesh design makes them difficult to clean. US20110127282 teaches the use of a disposable foil with expandable slits or flaps to the same effect. This design, although it does confer disposability, is also unsuited for use in the microwave and does not offer a safe handle for manipulation. U.S. Pat. No. 4,422,441 teaches a disposable metal foil guard without a handle that unfolds in a concertina manner to cover the cooking vessel. It is also unsuitable for microwave use and, being made of a highly conductive material, would not be able to be repositioned comfortably. U.S. Pat. No. 2,999,559 teaches the use of a disposable disc made out of fibrous material in conjunction with a metal ring, which rests on the periphery of the cooking vessel. Although the top disc is disposable, the metal ring, being metal, renders the entire device unsuitable for microwave use and still requires cleaning. U.S. Pat. No. 2,686,608 teaches the use of a cylindrical guard made out of disposable paper that sits inside a frying or other vessel and includes vents to encourage air circulation. Although not explicitly stated in the reference, this would be appropriate for microwave use, as well. However, the configuration of this device is such that it is open at the top and does not entirely prevent the splatter of grease and liquids. Also, this configuration lacks a handle for easy positioning and makes turning or other manipulations of food in the cooking vessel difficult.

The covering devices available for microwave cooking are generally made of plastic, cannot be cleaned easily, especially of grease, and cannot be used for stovetop or oven cooking. Other common materials used for covering vessels in the microwave include paper towels and napkins, standard parchment paper, or plastic wrap. Although disposable, these materials are flimsy and tend to get into the food being prepared. They become saturated or heavily coated with the cooking liquids and greases and become messy and misshapen, rendering repositioning difficult or impossible. Furthermore, these materials do not have handles for easy removal and can cause burns if removed by hand. Several disposable covers have been developed for microwave heating, but these are generally complex in design, made of absorbent materials and cannot be used for other cooking methods, such as stovetop or oven cooking. Some of these designs are also specific to shielding food from microwaves. Still others are configured such that they do not fully protect the interior of the microwave oven from splatters. For example, U.S. Pat. No. 7,414,229, U.S. Pat. No. 7,586,068 and U.S. Pat. No. 7,717,285 all teach splatter guards made out of breathable paper that sit around a vessel while being heated in a microwave oven. Although the configurations and materials of these utensils render them disposable and capable of keeping the top and side surfaces of the inside of the microwave secure from splatter, the bottom of both devices are substantially open, potentially allowing grease and liquids to run down the sides and accumulate at the bottom. Also, none of these references teach the use of heat and flame resistant paper, making them unsuited for stovetop and oven use and do not include top handles for ease of placement and positioning.

Coverings for use in the oven are also generally made of metal, glass or ceramic; are heavy; and, similar to covers used for stovetop cooking, can be expensive, cumbersome and non-disposable. Moreover, they are not permeable to moisture. Foil and parchment are sometimes used to cover certain foods during the oven cooking process. Although these materials are disposable, they are also flimsy, having no means of easy removal and replacement without risk of burns. Foil, also, is a non-permeable material. Clearly there is a need for a splatter guard that combines the convenience of being disposable, is non-absorbent yet permeable enough to offer preferred cooking conditions and is versatile enough to used with all common cooking methods and vessels.

SUMMARY OF INVENTION

The principle aim of the invention herein is to provide a cooking utensil that prevents splatter of grease and liquids during cooking operations that is versatile enough to be used in virtually any cooking vessel and with virtually any cooking method.

Another aim of the invention herein is to provide a cooking utensil that also provides the advantages of being non-absorbent, easy to handle and disposable.

To effect the aims of the invention, a disposable, non-absorbent splatter guard is described herein which is made of a semi-rigid, non-metallic, material which is also permeable to water vapor. The utensil includes a top handle for lifting and manipulating placement of the utensil, and the entire device is configured and dimensioned so as to conform to the shape and dimensions of the cooking vessel in such as way as to rest either on the rim of the vessel or just inside the rim of the vessel.

In one embodiment, the splatter guard is made of a single sheet of material such that the center portion folds upward to form a ridge-like handle that enables the entire utensil to be grasped and lifted during the cooking process in order to allow the food contained in the cooking vessel to be turned or stirred and the cover replaced for additional cooking.

In another embodiment, the material of the utensil is a flame resistant paper or fibrous material.

In yet another embodiment, the utensil is made of a laminate of one or more thin, non-absorbent, moisture permeable material with a more rigid, permeable layer, said layers being adhered using a food-safe, heat and moisture resistant adhesive.

In another embodiment, the material of the splatter guard has been treated with a non-stick coating.

In still another embodiment, the utensil includes perforations to aid the escape of steam and vapors.

DRAWINGS

REFERENCE NUMERALS

6. Cooking vessel.
8. Circular base.
10. One type of integrated handle.
12. Obround sheet.
14. Pre-creased center axis.
15. Pre-creased axis coincident with the flat edge of the semicircular section of the obround.
16. Attached handle.
18. Laminated structure.
20. Permeable, non-absorbent layer.
22. More rigid, permeable layer.

DESCRIPTION OF INVENTION

The invention herein relates to a disposable cooking utensil that can be universally used in almost any cooking method to eliminate the problems caused by splattering of grease and cooking liquids. In its broadest form, the utensil is made of a non-absorbent yet permeable, semi-rigid, non-metallic material that is versatile enough be used in a multitude of different cooking environments and can be dimensioned so as to fit a wide variety of cooking vessel shapes and sizes. The utensil includes a top handle for lifting and repositioning of the utensil, and the entire device is configured and dimensioned so as to conform to the shape and dimensions of the cooking vessel in such as way as to rest either on the rim of the vessel or just inside the rim of the vessel. The material comprising the splatter guard is minimally heat conductive so as to be safely and comfortably handled when repositioning or otherwise manipulating the splatter guard during cooking. Being non-absorbent, when the splatter guard is allowed to rest directly above the food being cooked, minimal fluid and grease absorption occurs, which enables cooking to proceed in a manner similar to that in which it would occur without a cover, rendering it suitable for frying, searing and sautéing operations.

Figure 1:
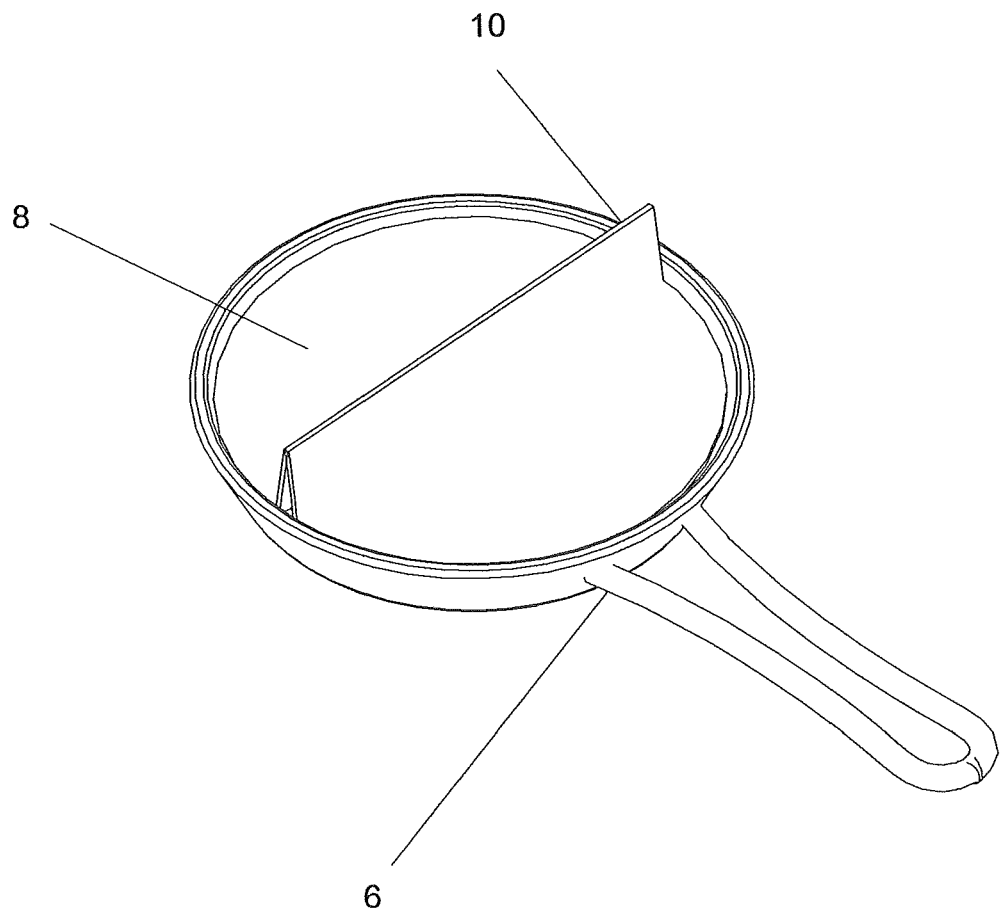
FIG. 1 is an isometric view of one embodiment of the disposable splatter shield, as it would be used with a frying pan in a stovetop application.

With reference to FIG. 1 for purposes of illustration, the present invention is preferentially embodied in an approximately circular shape dimensioned so that the circular base 8, which forms the actual splatter guard, rests just inside the rim of the cooking vessel 6. The handle 10 shown in FIG. 1 is integrated into the utensil, the whole device being formed from single sheet of material. The entire cover, with integrated handle, has sufficient wet-strength and rigidity to maintain its shape and integrity so as to be easily removable and replaceable during cooking.

Figure 2:
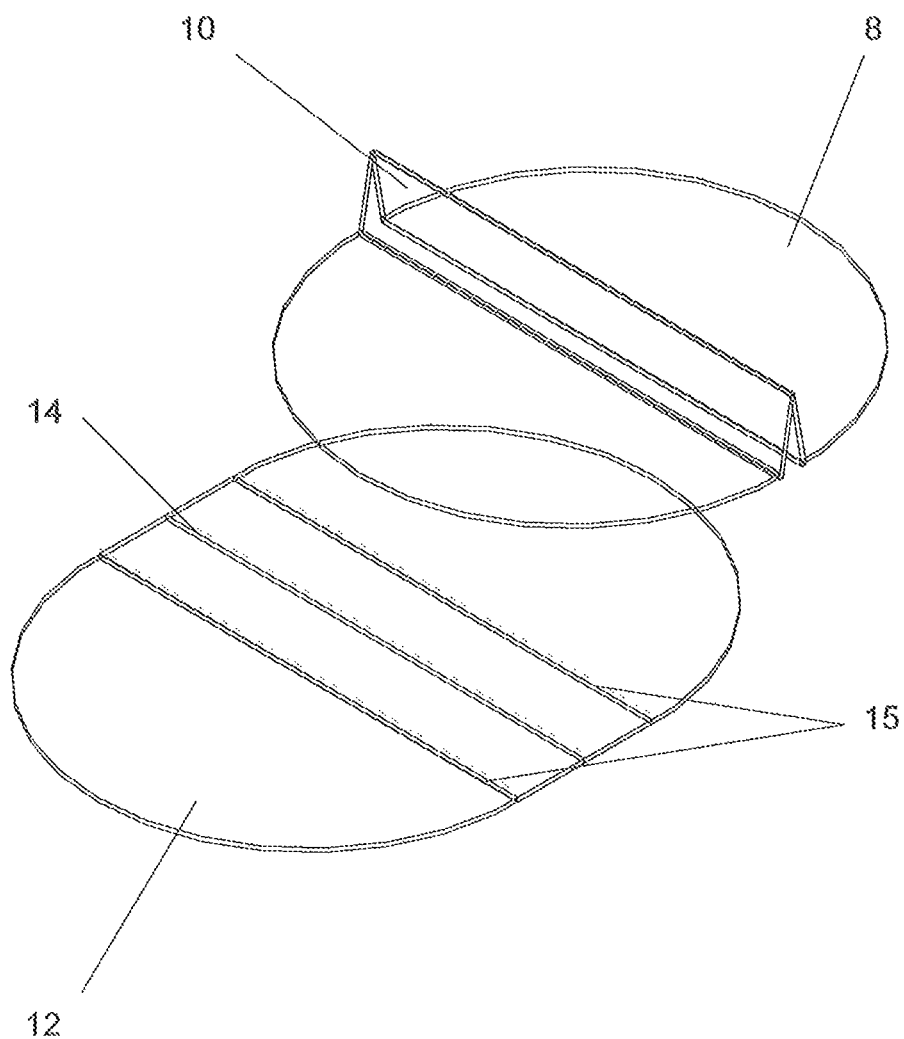
FIG. 2 illustrates a method of forming one embodiment of the disposable splatter shield from a flat, obround sheet of material.

FIG. 2 illustrates how one embodiment of the utensil could be formed from a pre-creased, single sheet of material fashioned into the shape of an obround 12. An obround is two semicircles facing opposite directions and connected along their straight sides by a rectangular section of any non-zero length. When folded along the center axis of the obround and subsequently folded in the opposite manner about the two axis coincident with the straight sides of the two facing semicircular sections, the sheet takes on the shape of an inverted "T", with the bottom, horizontal part of the utensil now taking on the overall shape of a circle base 8 and the top, vertical fold becoming an integrated handle 10. The semicircular dimensions of the obround preferentially have equal radii such that, when folded as described above, the circular base 8 takes on a dimension approximately equal to the diameter of the intended cooking vessel 6.

Figure 3:
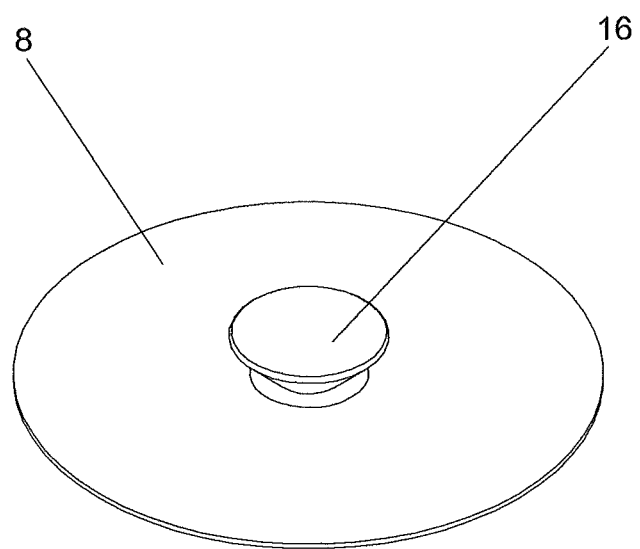
FIG. 3 shows another embodiment of the disposable splatter shield with an alternate design for the handle.

As would be obvious to anyone skilled in the art, alternative handle shapes and placements can be utilized for the utensil by simply attaching a handle to the base, using an adhesive or by mechanical attachment. One possible type of attached handle 16 is illustrated in FIG. 3.

As would also be obvious to anyone skilled in the art, perorations or slits can be configured into the base of the splatter guard to further enhance the release of water vapor during cooking.

The splatter guard can also be fashioned into a variety of shapes and sizes so as to conform to the shape and size best suited for use with specific cooking vessels.

Figure 4:
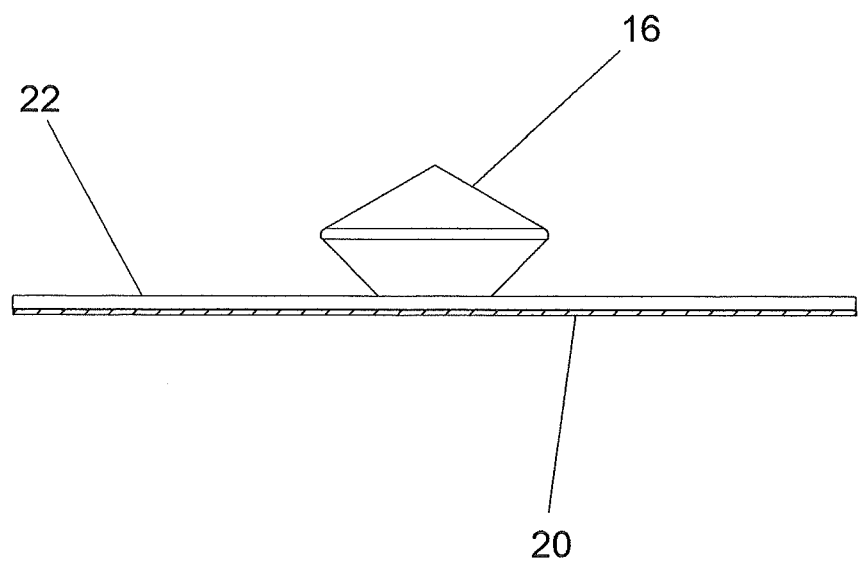
FIG. 4 shows another embodiment of the disposable splatter shield wherein the material of the splatter shield is comprised of a thin, permeable, non-absorbent bottom layer laminated to a semi-rigid and heat-insulating top layer.

Preferentially, the splatter guard can be formed from a homogeneous sheet of material, this being the simplest and most cost effective method. However, other material configurations can be envisioned, including composites and, as shown in FIG. 4, a laminated structure 18 where either or both surfaces of the splatter guard are formed from thin sheets of a permeable, non-absorbent material and the top or center sheet is made of a permeable material which confers rigidity to the entire structure, In another embodiment, the material of the utensil is a made from flame resistant paper or fibrous material or treated so as to be flame resistant. There are several treatments available to confer the property of making a material resistant to ignition and/or self-extinguishing that can be safely applied to paper or other fibrous materials. For example, it is known in the art that treating paper pulp with sulfuric acid. The process is known to form sulfurized crosslinks in the material that give the paper higher rigidity and chemical stability, substantially improving heat and flame resistance. Further, silicone or epoxy-based coatings can be applied which also render the material flame resistant.

In yet another embodiment, the material of the splatter guard may also be treated with anon-stick coating to aid in material release as the utensil is removed and/or repositioned during cooking.

To demonstrate the effectiveness of the herein described invention, a disposable splatter guard was made from a single obround of paper stock of approximately 0.01 inch thickness that had been chemically treated so as to render it heat-resistant and non-absorbent. The treated paper was folded as described above to create a disposable splatter guard with an essentially circular base and a handle with a height of approximately two inches. Six slices of bacon were then placed into a hot standard frying pan so that the strips of bacon were lying flat. The splatter-guard was placed over the bacon so that it was sitting directly on top of the bacon inside the rim of the pan. The bacon was allowed to fry at a high temperature for several minutes during which time the splatter guard very effectively prevented any grease from escaping the frying pan yet allowed water vapor to escape as evidenced by steam being visible above stovetop and the lack of water buildup in the frying pan, as can be easily observed when frying bacon with the aid of a solid, impermeable cover. The splatter guard was then lifted by the handle so that the bacon could be turned. Although sitting directly on top of the frying bacon, the whole splatter guard retained its mechanical and structural integrity and the handle was not uncomfortably warm, allowing easy removal and repositioning of the device after the food had been turned. After several repetitions of removing and repositioning the splatter guard to allow turning, the bacon was fully cooked and well browned to a pleasing level of crispness, further demonstrating that the splatter guard was effective at allowing the escape of moisture so as to allow a relatively high cooking temperature and an effective cooking environment for frying. Throughout the process, the splatter guard maintained its shape and relative rigidity and could be easily manipulated, After the cooking process was complete, the splatter guard was disposed of in a kitchen waste receptacle and clean up was simplified by the fact that minimal grease and other cooking liquids had been able to splatter onto the stovetop.

To demonstrate the effectiveness of the herein described invention in a microwave, a disposable splatter guard was made from a single obround of paper stock of approximately 0.01 inch thickness that had been chemically treated so as to render it heat-resistant and non-absorbent. The treated paper was folded as described above to create a disposable splatter guard with an essentially circular base and a handle with a height of approximately two inches. Cold, pre-cooked pasta was placed on a standard dinner plate. Spaghetti sauce containing meat was scooped onto the top of the pasta. The splatter guard was placed directly on top of the plate, touching the sauce and pasta. The plate was placed in the microwave and heated for a couple of minutes. During this heating cycle, the sound of popping and snapping from the heating if the tomato sauce and the meat could be heard coming from the microwave interior. Due to the effectiveness of the splatter guard all of the splatter created by the sauce, was contained and prevented from getting on the side and top walls of the microwave. The plate was removed from the microwave oven and the splatter guard was lifted from the plate using the handle, which was cool to the touch. The center portion of the contents of the plate remained cool compared to the temperature reached around the outside of the plate, as is common during shorter duration microwave cooking. Therefore, after stirring, the splatter guard was replaced onto the food and heating continued until the food was thoroughly warned. The splatter guard was easily lifted off and disposed of.

I claim:

1. A disposable, non-absorbent cooking utensil comprising a semi-rigid, non-metallic, splatter guard and a handle for lifting and manipulating placement of the utensil, the splatter guard being formed from of a single sheet of material originally shaped as a flat obround, an obround being defined as two semicircles facing opposite directions and connected along their straight sides by a rectangular section of any non-zero length, where the obround further comprises three pre-creased folds, one in the center of the rectangular section and the other two on either side of said center crease in positions that coincide to the flat edge of each semicircular section, the final shape of the splatter guard being formed by first folding the sheet in half at the center crease and then folding each side back along creases corresponding to the flat side of each semicircular section such that the entire rectangular section is raised into a handle perpendicular to the plane of the semicircular sections, with radii of the semicircular sections dimensioned so as to rest on or just within the rim of the cooking vessel and the length of the rectangular section long enough to form a raised, substantially flat handle of at least one half inch but no more than six inches, where the material that comprises the splatter guard is made from paper which has been chemically treated to render it temperature and flame resistant.

2. The cooking utensil according to claim 1 in which the splatter guard includes perforations to aid the escape of steam and vapors.

3. The cooking utensil according to claim 1 treated with a non-stick coating material.

4. The use of the cooking utensil according to claim 1 for covering cooking vessels used to prepare foods in stovetop, oven, microwave or counter-top cooking operations.

5. A disposable, non-absorbent cooking utensil comprising a semi-rigid, non-metallic, splatter guard and a handle for lifting and manipulating placement of the utensil, the splatter guard being formed from of a single sheet of material originally shaped as a flat obround, an obround being defined as two semicircles facing opposite directions and connected along their straight sides by a rectangular section of any non-zero length, where the obround further comprises three pre-creased folds, one in the center of the rectangular section and the other two on either side of said center crease in positions that coincide to the flat edge of each semicircular section, the final shape of the splatter guard being formed by first folding the sheet in half at the center crease and then folding each side back along creases corresponding to the flat side of each semicircular section such that the entire rectangular section is raised into a handle perpendicular to the plane of the semicircular sections, with radii of the semicircular sections dimensioned so as to rest on or just within the rim of the cooking vessel and the length of the rectangular section long enough to form a raised, substantially flat handle of at least one half inch but no more than six inches, where the material that comprises the splatter guard is a laminate of one or more thin, moisture-permeable materials with a more rigid moisture permeable layer, said layers being adhered using a food-safe, heat and moisture resistant adhesive.

6. The cooking utensil according to claim 5 where the sheets of the laminate are adhered using a food grade epoxy adhesive.

7. The cooking utensil according to claim 5 where the sheets of the laminate are adhered using a food grade silicone adhesive.

8. The cooking utensil according to claim 5 where the sheets of the laminate are adhered using a food grade melamine resin.

* * * * *